US012467304B2

(12) United States Patent
Müller et al.

(10) Patent No.: US 12,467,304 B2
(45) **Date of Patent: *Nov. 11, 2025**

(54) WINDOW LIFTER ASSEMBLY WITH A DRIVER FOR A WINDOWPANE AND DRIVER

(71) Applicant: Brose Fahrzeugteile SE & Co. Kommanditgesellschaft, Bamberg, Bamberg (DE)

(72) Inventors: Jörg Müller, Ahorn (DE); Bert Almes, Merseburg (DE); Udo Taubmann, Bad Rodach (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,600

(22) Filed: Dec. 4, 2023

(65) Prior Publication Data

US 2024/0110423 A1 Apr. 4, 2024

Related U.S. Application Data

(63) Continuation of application No. PCT/EP2022/064523, filed on May 30, 2022.

(30) Foreign Application Priority Data

Jun. 2, 2021 (DE) ..................... 10 2021 205 646.6

(51) Int. Cl.
*E05F 11/38* (2006.01)

(52) U.S. Cl.
CPC ......... *E05F 11/385* (2013.01); *E05Y 2900/55* (2013.01)

(58) Field of Classification Search
CPC . E05F 11/385; E05F 2011/387; E05F 11/382; E05F 15/689; E05F 15/6896;
(Continued)

(56) References Cited

U.S. PATENT DOCUMENTS 5,992,099 A * 11/1999 Thomas ................ E05F 11/385 49/375
6,588,152 B2 * 7/2003 Cabbane ............... E05F 11/385 49/374

(Continued)

FOREIGN PATENT DOCUMENTS

DE 202008006718 U1 9/2009
DE 102010023460 A1 1/2011

(Continued)

*Primary Examiner* — Daniel P Cahn
*Assistant Examiner* — Patrick B. Ponciano
(74) *Attorney, Agent, or Firm* — Laurence A. Greenberg; Werner H. Stemer; Ralph E. Locher

(57) ABSTRACT

A window lifter assembly for an adjustable windowpane of a motor vehicle has a guide rail and a driver with a connecting leg connecting two driver legs separated by a receptacle gap. The first driver leg is configured to mount and guide the driver on the guide rail. The second driver leg is elastically displaceable relative to the first driver leg and has a latching element which protrudes into the receptacle gap. When inserting the adjustable windowpane into the receptacle gap of the driver, the latching element engages in a pane-proximal latching opening of the windowpane. The driver further has a resting contour on which the second driver leg is supported as a result of a tensile force acting on the latching element by the adjustable windowpane in a closing direction or a closed position of the adjustable windowpane.

9 Claims, 6 Drawing Sheets

(58) Field of Classification Search
CPC ............. E05Y 2600/53; E05Y 2201/64; E05Y 2201/684; E05Y 2600/502; E05Y 2900/55; E06B 3/5445; E05D 15/165
See application file for complete search history.

(56) References Cited

U.S. PATENT DOCUMENTS

| | | | | |
|---|---|---|---|---|
| 8,146,293 | B2 * | 4/2012 | Brownlie, Jr. | E05F 11/385 49/375 |
| 8,739,467 | B2 * | 6/2014 | Reno | E05F 11/385 49/374 |
| 8,966,820 | B2 * | 3/2015 | Broadhead | E05F 11/483 49/374 |
| 9,822,571 | B2 * | 11/2017 | Reinke | E06B 3/5445 |
| 10,246,926 | B2 * | 4/2019 | Lagenstroeer | B60J 1/004 |
| 10,876,344 | B2 * | 12/2020 | Taubmann | E05F 15/689 |
| 11,118,390 | B2 * | 9/2021 | Mueller | E05F 11/483 |
| 11,965,370 | B2 * | 4/2024 | M?ller | E05F 15/697 |
| 12,054,977 | B2 * | 8/2024 | Almes | E05F 11/385 |

FOREIGN PATENT DOCUMENTS

| | | | | |
|---|---|---|---|---|
| DE | 102012223825 A1 | * | 7/2013 | E05F 11/385 |
| EP | 1352143 B1 | * | 10/2005 | E05F 11/385 |
| EP | 2811098 B1 | | 9/2018 | |

* cited by examiner

WINDOW LIFTER ASSEMBLY WITH A DRIVER FOR A WINDOWPANE AND DRIVER

CROSS-REFERENCE TO RELATED APPLICATION

This application is a continuation, under 35 U.S.C. § 120, of copending International Patent Application PCT/EP2022/064523, filed May 30, 2022, which designated the United States; this application also claims the priority, under 35 U.S.C. § 119, of German Patent Application DE 10 2021 205 646.6, filed Jun. 2, 2021; the prior applications are herewith incorporated by reference in their entirety.

FIELD AND BACKGROUND OF THE INVENTION

The invention relates to a window lifter assembly for an adjustable windowpane of a motor vehicle, having a driver which is guided on a guide rail and has two driver legs which are connected by a connecting leg and between which is formed a receptacle gap for the windowpane. The invention furthermore relates to a driver for such a window lifter of a motor vehicle.

Movable vehicle windowpanes are usually displaced between a closed position and an open position by electrically or electric-motor operated actuating devices as vehicle window lifters. Such a window lifter typically contains an electric-motor adjustment drive and an actuating mechanism of a window lifter assembly, which connects the adjustment drive to the windowpane, i.e. couples the adjustment drive in a force-transmitting manner to the windowpane, the window lifter assembly being assigned to a motor vehicle door or a motor vehicle body.

In order to guide the windowpane, the latter in the case of a vehicle door is provided on a lower window edge with at least one (pane) driver as the pane guiding element, wherein the driver in at least one guide rail of the window lifter assembly, which acts as an adjustment or guide path, is guided along an adjustment path which is oriented in the direction of the vehicle height (Z-direction).

A driver of the type mentioned above typically has a rail slide which is made of a plastics material. The rail slide typically has a main body with a guide region which in the assembled state, as a rail wrap-around, encompasses the guide rail. In other words, the guide rail sits inside the guide region. In this way, the rail slide, or the main body, and the guide rail engage in one another. When engaged, the rail slide is mounted so as to be displaceable along the guide rail in such a way that the windowpane is guided linearly between the closed position and the open position. For example, the main body of the rail slide for mechanical attachment is coupled to the windowpane by way of a pane holder as the (pane) driver.

In order for the driver to be connected to the windowpane, the driver has, for example, two driving or clamping legs which are specified and provided to receive therebetween, for example in a clamping manner, the windowpane to be adjusted. For this purpose, the driver legs are movable relative to one another. The windowpane by way of the lower edge thereof is received between the driver legs of the driver and subsequently clamped or jammed between the two driver legs by converging the latter. A threaded connection with a screw or a threaded bolt as the tensioning element can be used for bracing the two driver legs, one of the two driver legs being converged toward the other driver leg by way of the tensioning element.

The driver can also be configured for latching (snap-fitting) the windowpane without screws. For this purpose, it is known, for example from published, non-prosecuted German patent application DE 10 2012 223 825 A1, to establish the connection between the driver and the windowpane without tools by way of an elastically displaceable latching portion having a latching cam. For connecting the windowpane to the driver, the latching portion herein is elastically displaceable counter to a restoring force, so that the latching cam of the latching portion, as a result of the restoring force, is brought to engage with a pane-proximal latching opening, the connection between the windowpane and the driver being established in this way.

A tensile force acting on the windowpane in the closing direction of the latter, and an associated displacement of the windowpane in the Z-direction (in terms of the typical vehicle coordinate system) can lead to the elastically displaceable latching portion of the driver moving to a fixed portion or leg of the driver in the Z-direction and/or in the opposite direction, with the result that the latching cam slides out of the latching opening of the pane (or a pane adapter connected to the windowpane), thus unintentionally releasing the connection between the windowpane and the driver in this way.

SUMMARY OF THE INVENTION

The invention is based on setting forth a window lifter assembly having a driver which can be reliably connected, or is reliably connected, to a windowpane of a motor vehicle and which is provided and specified for establishing an in particular tool-free, secured latching connection with the windowpane. In particular, the windowpane is not to make its way out of the connection with (anchoring to) the driver when the adjustment or window lifter drive is activated in the opening direction of the windowpane, even when the latter is stiff to operate, for example when the window frame is stuck due to frost. Furthermore, the intention is to set forth a suitable driver for such a window lifter assembly (a window lifter).

In terms of the window lifter assembly, the object is achieved according to the invention by the features of the independent window lifter assembly claim, and in terms of the driver by the features of the independent driver claim. Advantageous design embodiments and refinements are the subject matter of the dependent claims.

With the foregoing and other objects in view there is provided, in accordance with the invention, a window lifter assembly for an adjustable windowpane of a motor vehicle which has a guide rail and a driver with a connecting leg and two driver legs connected by the connecting leg. Between the two driver legs is a receptacle gap for the adjustable windowpane. The two driver legs include a first driver leg configured to mount and guide the driver on the guide rail and a second driver leg being elastically displaceable in relation to the first driver leg and has a latching element which protrudes into the receptacle gap. When inserting the adjustable windowpane into the receptacle gap of the driver the latching element engages in a pane-proximal latching opening of the windowpane. The driver further has a resting contour on which the second driver leg is supported as a result of a tensile force acting on the latching element by way of the adjustable windowpane in a closing direction or a closed position of the adjustable windowpane.

The window lifter assembly is provided and specified to adjust a windowpane, in particular of a side door of a motor vehicle, along an adjustment path and to displace the windowpane between a closed position and an open position. For this purpose, the window lifter assembly has a (pane) driver that is guided on a guide rail and has two driver legs which are connected by a connecting leg between which is formed a receptacle gap (pane gap) for the windowpane. For this purpose, the driver—when viewed in the longitudinal section, or when viewed laterally onto the receptacle gap—is approximately U-shaped, wherein the two U-legs form the driver legs, and the connection between the two U-legs on the gap base forms the connecting leg.

A first driver leg is configured for mounting and guiding the driver on the guide rail. The first driver leg, hereunder also referred to as the fixed (driver) leg, preferably has an in particular L-shaped rail wrap-around which encompasses the guide rail, or a rail contour, of the guide rail, the latter being hat-shaped, for example.

The second driver leg, hereunder also referred to as the movable (driver) leg, is (flexurally) elastically displaceable or deformable in relation to the first driver leg, and has a latching element which protrudes in (or into) the receptacle gap and when inserting the windowpane into the receptacle gap of the driver engages in a pane-proximal latching opening, or latches or snaps into the latter in a form-fitting manner.

The driver has a resting contour on which the second (movable) driver leg is supported in the event of a tensile force acting on the latching element by way of the windowpane in the closing direction of the latter. The resting contour, in the gap longitudinal direction directed toward the gap base of the receptacle gap (in the insertion direction of the windowpane into the receptacle gap), is suitably disposed behind the latching element. The resting contour, in the gap longitudinal direction outside the receptacle gap, is expediently disposed in the region of the connecting leg, preferably integrally molded thereon.

Provided on the second (movable) driver leg in an advantageous design embodiment is a supporting contour which, in the gap longitudinal direction directed toward the gap base of the receptacle gap (in the insertion direction of the windowpane into the receptacle gap), is disposed downstream (downstream in spatial terms) of the resting contour of the driver. The supporting contour on the second (movable) driver leg is suitably integrally molded thereon so as to be movable in relation to the resting contour of the driver in the gap longitudinal direction.

The supporting contour of the second (movable) driver leg is preferably disposed at a spacing from the resting contour of the driver. The spacing decreases as the displacement of the latching element in the gap longitudinal direction toward the gap opening increases as a result of a tensile force acting on the windowpane. The spacing between the driver-proximal resting contour and the flexural leg-proximal supporting contour is preferably sized in such a manner that, in the event of a (tensile) force acting on the latching element, in particular by way of the windowpane, the contours come to rest on one another before the latching element can slide out of the pane-proximal latching opening and the latching connection, or snap-fit connection, between the driver and the windowpane is released.

A supporting contour which projects transversely to the gap longitudinal direction of the receptacle gap and/or a resting contour which projects transversely to the gap longitudinal direction of the receptacle gap are/is particularly advantageous. The resting contour fixed to the driver, and the (leg-proximal) supporting contour containing the second driver leg, which is movable, in particular in the gap longitudinal direction of the receptacle gap for the windowpane, expediently overlap one another (are mutually congruent) in such a way that the leg-proximal supporting contour can be supported on the resting contour fixed to the driver, and preferably can also slide along the latter in the transverse direction to the gap longitudinal direction (in the Y-direction in terms of the vehicle coordinate system) when a tensile force acts on the latching element by way of the windowpane.

In an expedient design embodiment, the connecting leg between the two driver legs of the driver, in a connecting or functional portion which adjoins (is contiguous to) the gap base of the receptacle gap and contains the resting contour of the driver, is configured so as to be constricted in relation to at least the second movable driver leg, or configured so as to be waisted transversely to the gap longitudinal direction of the receptacle gap which receives the windowpane in the region of a pane lower edge including the latching opening.

The latching element is suitably configured in the manner of an in particular triangular (triangular-shaped) latching hook. The latching element preferably has an introduction ramp which is inclined toward the gap base of the receptacle gap and/or a blocking edge which is inclination-free toward the gap opening of the receptacle gap and is normal (perpendicular) in relation to the plane of the second (movable) driver leg, by way of which the latching element when connecting to the windowpane penetrates, preferably completely, the latching opening of the latter.

The driver which is provided and specified for a window lifter or a window lifter assembly of the type mentioned, has a receptacle gap between a first driver leg and a second driver leg for a windowpane, the second driver leg being (flexurally) elastically displaceable in relation to the first driver leg, having a latching opening and a latching element, provided on the second driver leg and protruding into the receptacle gap, for engaging in the pane-proximal latching opening, and a blocking function which blocks in elongating and/or bending of that driver leg that contains the latching element beyond a permissible, specified and/or specifiable degree, and/or after exceeding a specified or specifiable spacing between leg-proximal contours.

Other features which are considered as characteristic for the invention are set forth in the appended claims.

Although the invention is illustrated and described herein as embodied in a window lifter assembly with a driver for a windowpane, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Equivalent parts and variables are provided with the same reference signs in all figures.

Figure 1:
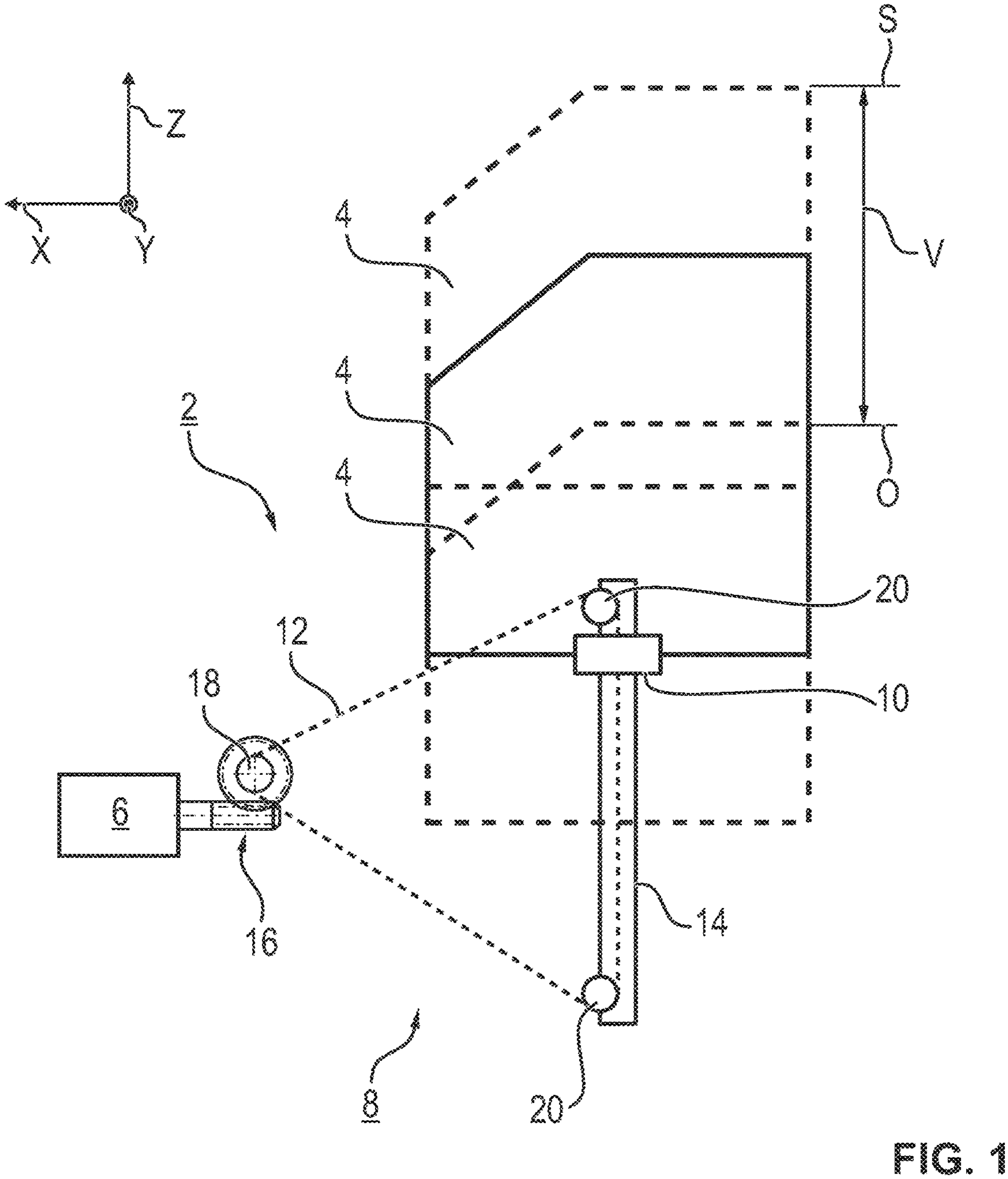
FIG. 1 is a schematic illustration showing a vehicle window lifter having an adjustment drive (activating motor) and having a window lifter assembly having a (pane) driver which is coupled to a windowpane.

Referring now to the figures of the drawings in detail and first, particularly to FIG. 1 thereof, there is shown in a simplified schematic illustration an electric or electric-motor window lifter assembly 2 as an actuating device for a (vehicle) windowpane 4 of a motor vehicle. The window lifter assembly 2 is assigned an adjustment drive 6 which, by means of an actuating mechanism 8 having a driver 10 of the window lifter assembly 2, acts on the windowpane 4. In the exemplary embodiment shown, the actuating mechanism 8 has a traction cable 12 and a guide rail 14 of the window lifter assembly, the driver 10 being displaceably guided along an adjustment path V on the guide rail 14. A plurality of, for example two, traction cables 12 may also be provided.

The adjustment drive 6 of the window lifter 2 drives a cable drum 18 of the actuating mechanism 8 by way of a worm gear or spur gear 16. The traction cable 12 of the cable mechanism is disposed on the cable drum 18 in such a manner that the traction cable 12 is wound and unwound by rotations of the cable drum 18 caused by the gear 16. The traction cable 12 of the cable mechanism, which is embodied as a Bowden cable, for example, is guided by way of deflection elements or deflection rollers 20 and coupled to the driver 10 which in turn is guided along the guide rail 14 and in the process conjointly moves the windowpane 4.

When the actuating motor 6 is activated, the windowpane 4 is displaced along the adjustment path V to the set or desired (pane) position of the windowpane 4. The windowpane 4 is reversibly displaceable between a closed position S, which represents the topmost possible position, and an open position O, which represents the bottommost possible position. The windowpane 4 in FIG. 1 is in each case indicated by dashed lines in these positions S and O. In contrast, the windowpane 4 is illustrated by solid lines in a half-opened intermediate position.

Indications in terms of the spatial directions hereunder are also stated in a coordinate system of the motor vehicle (vehicle coordinate system) in terms of the exemplary installed situation in a side door of the motor vehicle. The abscissa axis (X-axis) here is oriented along the vehicle longitudinal direction, and the ordinate axis (Y-axis) along the vehicle transverse direction, and the applicate axis (Z-axis) along the vehicle height. The axial direction A herein is oriented so as to be parallel to the abscissa axis (X), whereby the radial direction R is aligned so as to be substantially parallel to the ordinate axis (Y).

Figure 2:
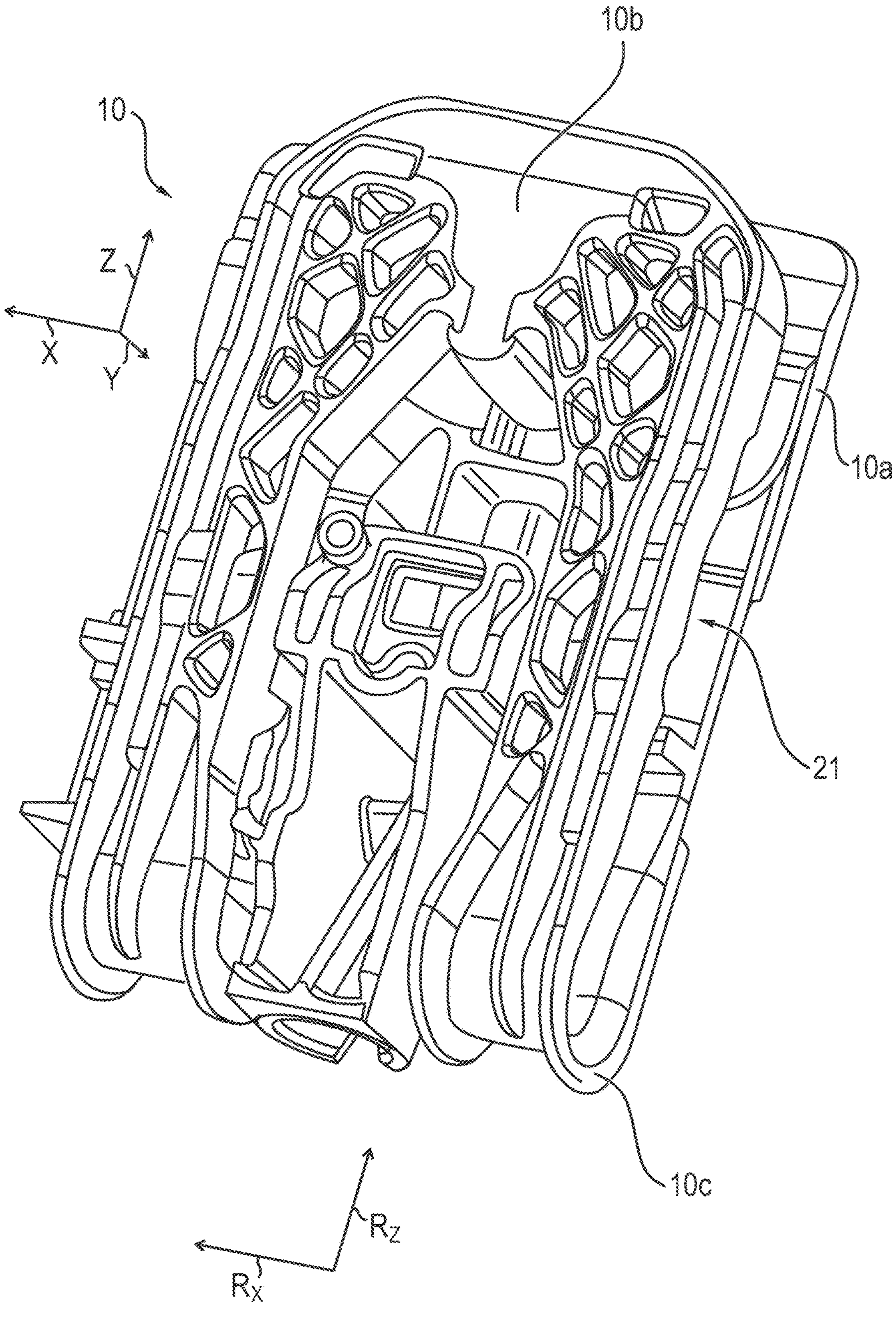
FIG. 2 is a perspective illustration of the driver having a receptacle gap (pane gap), formed between driver legs, for the windowpane, with a view onto a movable (second) driver leg.
Figure 3:
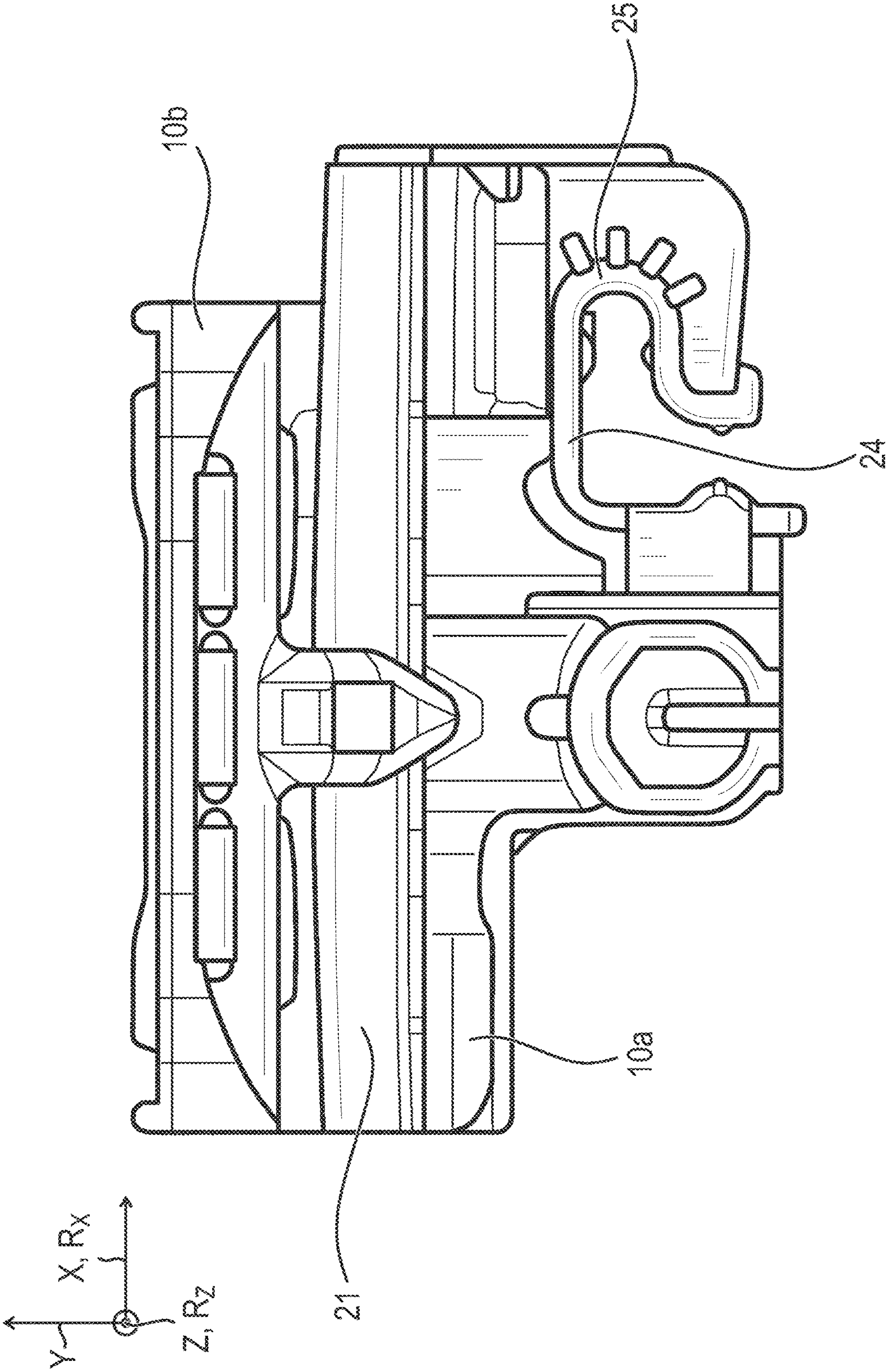
FIG. 3 is an end-side view of the driver with a view onto a gap opening for introducing the windowpane into the receptacle gap, and a latching element, protruding into the receptacle gap, on one of the driver legs, and a rail wrap-around on the other driver leg.
Figure 4:
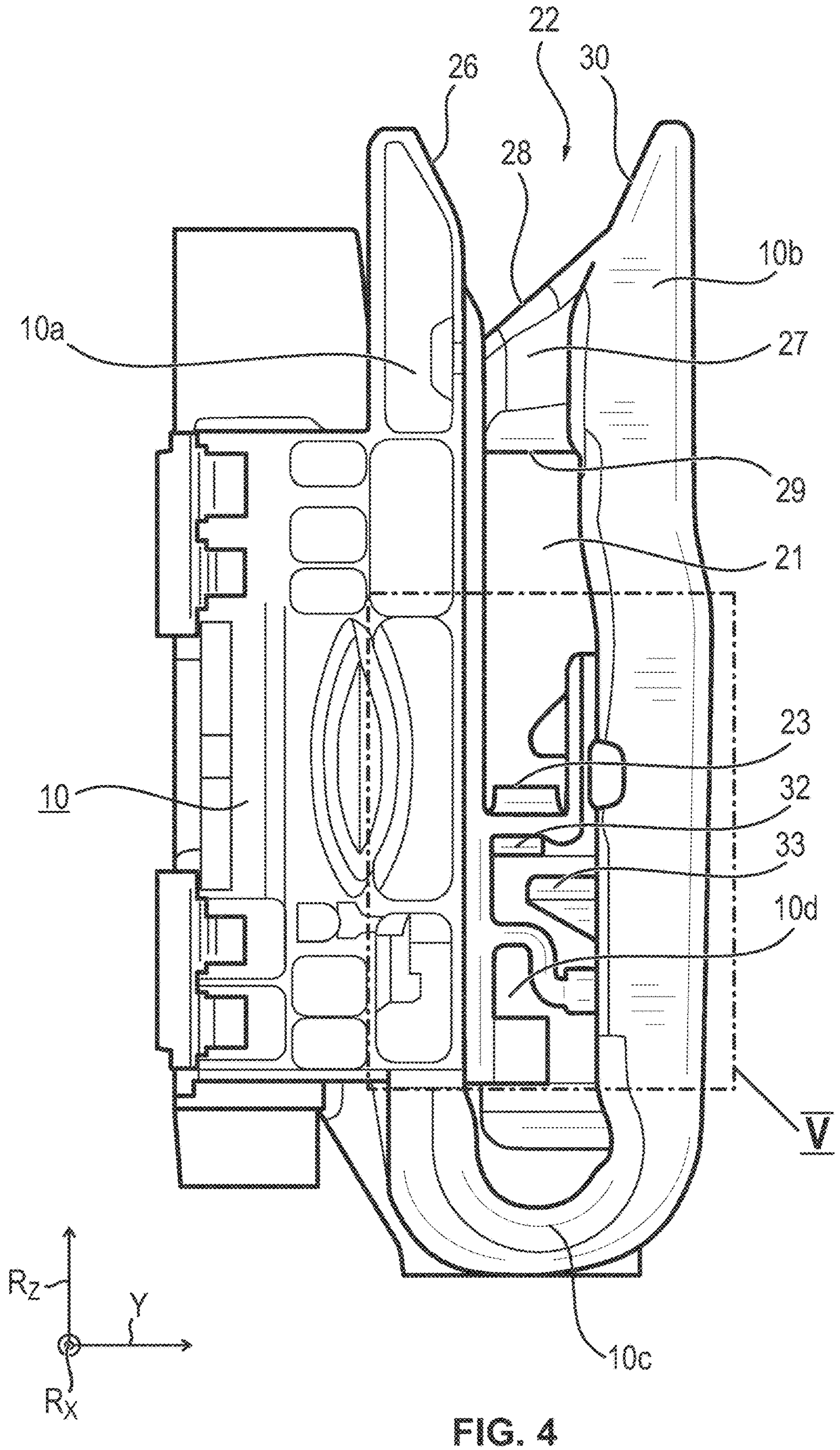
FIG. 4 is a lateral view showing the driver with a view onto a flexural leg-proximal supporting contour and a driver-proximal resting contour, which is spaced apart from the former, in a constricted (waisted) functional portion of the connecting leg between the driver legs.

FIGS. 2 to 4 show the driver 10 in various views. The orientation of the driver 10 shown corresponds to the directions X, Y, Z of the depicted vehicle coordinate system. The driver 10 is configured so as to be approximately U-shaped or V-shaped and has a first driver leg **10*a* and a second driver leg 10*b*. A receptacle or pane gap 21 having a gap opening 22 and having a gap base 23 is formed between the driver legs 10*a* and 10*b*. The driver legs 10*a* and 10*b* are connected to one another by way of a connecting leg 10*c*. The connecting leg 10*c* has a waisted connecting or functional portion 10*d* which is constricted in the X-direction and gap transverse direction RX of the receptacle gap 11. This connecting or functional portion 10*d* extends to the gap base 23 of the receptacle gap 21**.

The first driver leg **10*a* has a rail wrap-around 24 which is approximately L-shaped in the cross section (FIG. 3). By way of this rail wrap-around 24, the driver 10 sits on the approximately hat-shaped guide rail 14 and on the latter on a correspondingly shaped rail portion. A sliding piece 25 made from a low-friction material, for example from polyoxymethylene (POM), is inserted in the rail wrap-around. The first driver leg 10*a* in the assembled state of the window lifter assembly 2 is guided along the guide rail 14 and held on the latter. Therefore, the first driver leg 10*a* is also referred to hereunder as the fixed driver leg of the driver 10. The first, fixed driver leg 10*a* has an introduction ramp 26 in the region of the gap opening 22 of the receptacle gap 21 (FIG. 4**).

The second driver leg **10*b* is elastically displaceable, or flexurally elastically deformable and thus movable in relation to the first, fixed driver leg 10*a*, in particular in the Y-direction, but also at least slightly in the Z-direction and thus in the gap longitudinal direction RZ of the receptacle gap 21. A latching element 27 which protrudes (in the -direction) into the receptacle gap 21 is integrally molded on the second driver leg 10*b*, the latter also being referred to as movable hereunder. The latching element 27 is configured as a triangular latching hook and has an introduction ramp 28 which is inclined toward the gap base 23 of the receptacle gap 21, and a blocking edge 29 which is inclination-free toward the gap opening 22 of the receptacle gap 21 and normal (perpendicular) in relation to the XZ-plane of the second (movable) driver leg 10*b*. The second (movable) driver leg 10*b* likewise has an introduction ramp 30 in the region of the gap opening 22 of the receptacle gap 21**.

The windowpane 4 can be inserted in a simple and error-free manner into the receptacle gap 21 of the driver 10 by way of the leg-proximal introduction rams 26, 30 of the latter. The windowpane 4, with the pane lower edge thereof ahead, by way of the gap opening 22, is inserted into the receptacle gap 21 and between the two drivers **10*a* and 10*b*, and latched in the receptacle gap 21. In the process, the windowpane 4 by way of the pane lower edge thereof slides along the inclined introduction ramp 28 of the latching element or hook 27. The second, movable driver leg 10*b* of the driver 10 is hereby elastically bent in the Y-direction, and the latching element 27 snaps, engages or latches, in particular in the form-fitting manner, into a latching opening 31 of the windowpane 4, which is indicated by dashed lines in FIGS. 6A and 6B. In the snap-fit or latching connection of the windowpane 4 with the driver 10, the blocking edge 29 of the latching element 27 penetrates, ideally completely, the pane-proximal latching opening 31**.

The driver 10 has a blocking function which is provided (implemented) in particular by blocking contours. This blocking function blocks elongating or bending of that driver leg 10*b* that contains the latching element 27, as a result of a tensile force beyond a permissible degree acting by way of the windowpane in the Z-direction on the latching element 27, which is latched to the windowpane. It is reliably prevented as a result that the latching element (latching hook) 27 slides out of the corresponding pane-proximal latching opening 31.

Figure 5:
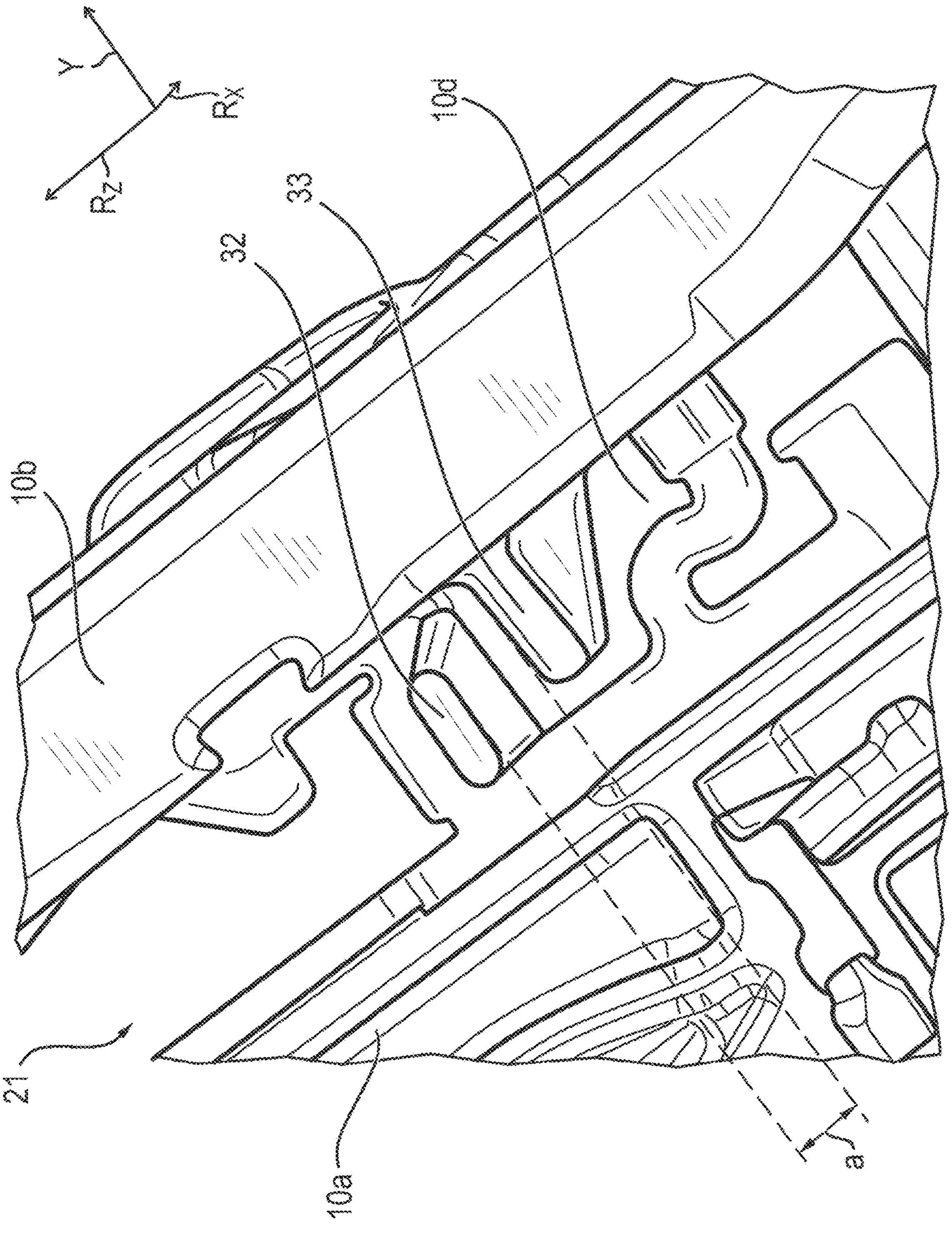
FIG. 5 is a perspective view of detail V shown in FIG. 4 in a larger scale with a view onto the projecting supporting and resting contours.
Figure 6B:
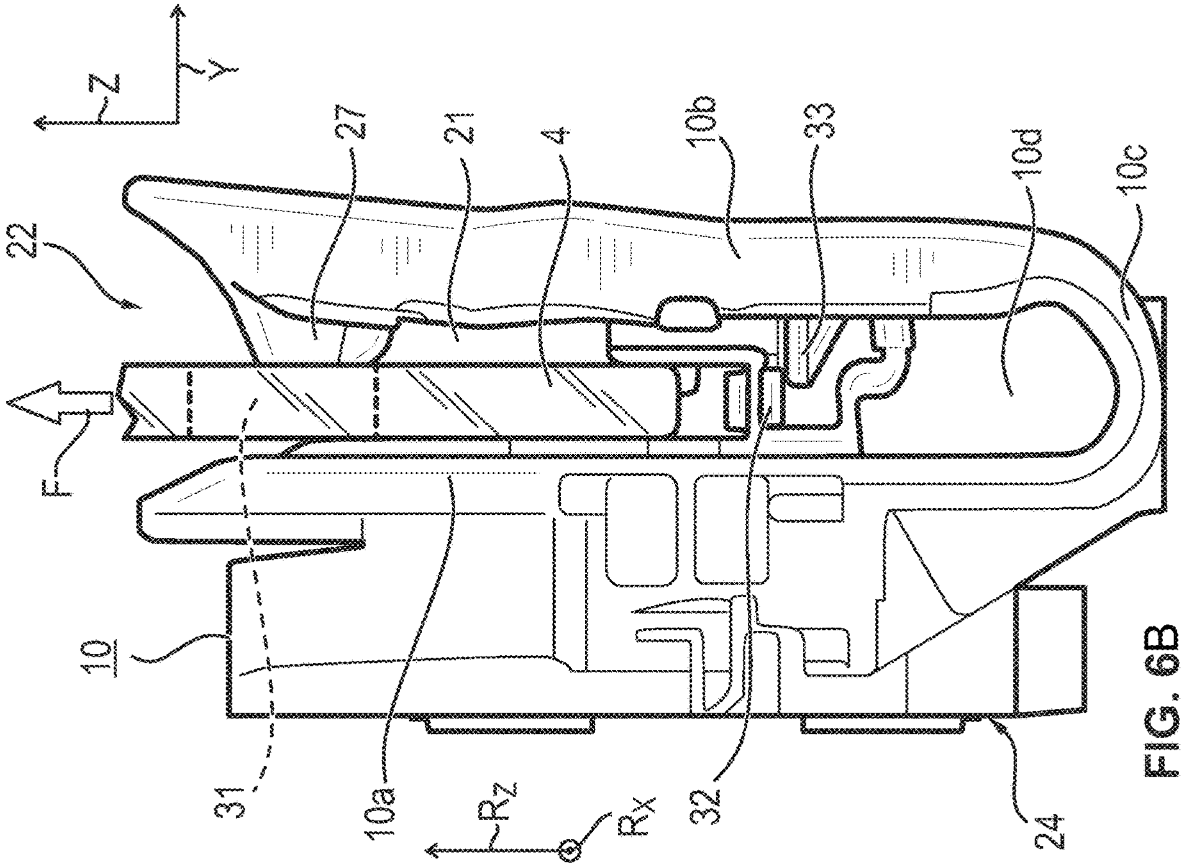
FIGS. 6A and 6B are lateral views according to FIG. 4 of the driver having in the receptacle gap of the latter the windowpane inserted and latched therein in a tension-free installed position, or in a limited deflected position of the driver leg that contains the latching element, which is the result of a tensile force acting on the windowpane.

With a view to FIGS. 4 and 5 as well as 6A and 6B, the driver 10 in the exemplary embodiment for this purpose has a first blocking contour or resting contour 32 on which the second driver leg 10*b* is supported as a result of a tensile force F acting on the latching element 27 by way of the windowpane 4 in the closing direction of the latter (FIG. 6B). The resting contour 32 is disposed behind the latching element 27 in the gap longitudinal direction RZ directed toward the gap base 23 (FIG. 4) of the receptacle gap 21, thus in the insertion direction of the windowpane 4 into the receptacle gap 21. Thus, the resting contour 32 is disposed downstream of the latching element 27 in spatial terms. The resting contour 32, in the gap longitudinal direction RZ outside the receptacle gap 21, is disposed in the region of the connecting portion 10*d* of the driver 10 and integrally molded thereon.

A second blocking or supporting contour 33 on the second, movable driver leg 10*b* is disposed downstream of the resting contour 32 of the driver 10 in the gap longitudinal direction RZ directed toward the gap base 23 of the receptacle gap 21, thus in the insertion direction of the windowpane 4 into the receptacle gap 21. The supporting contour 33 is integrally molded on the second, movable driver leg 10*b* and thereby movable in relation to the resting contour 32 of the driver 10 in the gap longitudinal direction RZ.

The blocking contours 32, 33 are configured as a resting or supporting rib, respectively, which extend in the gap transverse direction RX. The supporting contour 33 of the second (movable) driver leg 10*b* is disposed at a spacing a (FIG. 5) from the resting contour 32 of the driver 10.

Figure 6A:
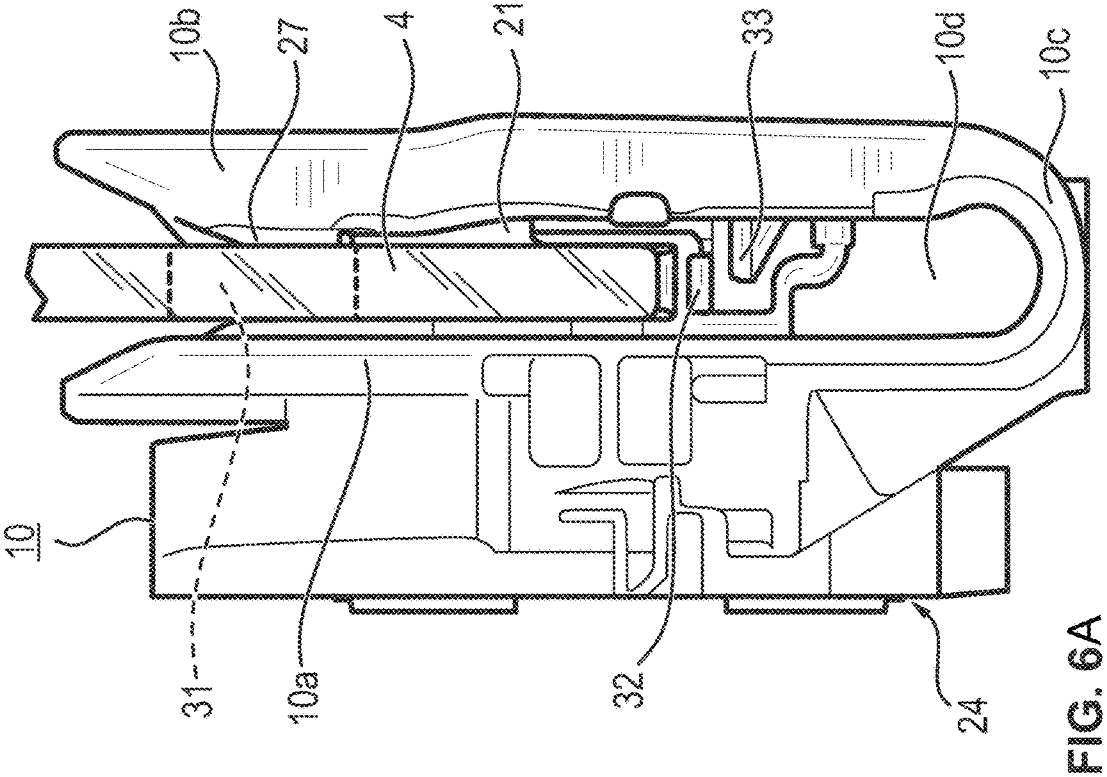

As can be seen by comparing FIGS. 6A and 6B, this spacing decreases as the displacement of the latching element 27 in the gap longitudinal direction RZ toward the gap opening 22 of the receptacle gap 21 increases as a result of a tensile force F acting on the windowpane 4. Once this specified spacing a between the leg-proximal contours 32, 33 is exceeded, further elongating of the second driver leg 10*b*, which comprises the latching element 27, in the Z-direction and further bending of the second driver leg 10*b* in the Y-direction is blocked.

The (immovable) resting contour 32, which is fixed to the driver, and the blocking contour 33 (which in contrast is movable) of the second driver leg 10*b* overlap one another (are mutually congruent) in the gap longitudinal direction RZ of the receptacle gap 21 for the windowpane 4 in such a way that the leg-proximal supporting contour 33 can be supported on the resting contour 32, which is fixed to the driver, when the tensile force F acts on the latching element 27 by way of the windowpane 4, and the spacing a between the contours 32 and 33 has been used up.

In summary, the invention relates to a window lifter assembly 2 for an adjustable windowpane 4 of a motor vehicle, having a driver 10 with a first driver leg 10*a* and a second driver leg 10*b* which is (flexurally) elastically displaceable in relation to the first driver leg 10*a*, and a latching element 27 which protrudes into a receptacle gap 21 between the driver legs 10*a*, 10*b* and when inserting the windowpane 4 into the receptacle gap 21 of the driver 10 engages in a pane-proximal latching opening 31. The driver 10 has a blocking function which blocks elongating and/or bending of that driver leg 10*b* that contains the latching element 27 beyond a permissible degree and/or after exceeding a specified or specifiable spacing a between leg-proximal contours 32, 33.

For this purpose, the driver 10 preferably has a resting contour 32 on which the second driver leg 10*b* is supported as a result of a tensile force F acting on the latching element 27 by way of the windowpane 4 in the closing direction or closed position S of the latter. Furthermore preferably provided for this purpose on the second driver leg 10*b* is a supporting contour 33 which in the gap longitudinal direction RZ is spaced apart from the resting contour 32.

The invention is not limited to the exemplary embodiments described above. Rather, other variants of the invention can be derived therefrom by the person skilled in the art without departing from the subject matter of the invention. In particular, all individual features described in the context of the exemplary embodiment can also be combined with one another in a different way without departing from the subject matter of the invention.

The following is a summary list of reference numerals and the corresponding structure used in the above description of the invention.

LIST OF REFERENCE SIGNS

2 Window lifter assembly
4 Windowpane
6 Adjustment drive
8 Actuating mechanism
10 Driver
10*a* First (fixed) driver leg
10*b* Second (movable) driver leg
10*c* Connecting leg
10*d* Connecting/functional portion
12 Traction cable
14 Guide rail
16 Worm gear/Spur gear
18 Cable drum
20 Deflection element/roller
21 Receptacle gap
22 Gap opening
23 Gap base
24 Rail wrap-around
25 Sliding piece
26 Introduction ramp
27 Latching element/hook
28 Introduction ramp
29 Blocking edge
30 Introduction ramp
31 (Pane-proximal) latching opening
32 Blocking/Resting contour/rib
33 Blocking/Supporting contour/rib
a (Contour) spacing
F (Tensile) force
S Closed position
O Open position
RX Gap transverse direction
RZ Gap longitudinal direction
V Adjustment path X,Y,Z Direction (in the vehicle coordinate system)

The invention claimed is:

1. A window lifter assembly for an adjustable windowpane of a motor vehicle, the window lifter assembly comprising:

a guide rail;

a driver having a connecting leg and first and second driver legs connected by said connecting leg and between said first and second driver legs is formed a receptacle gap for the adjustable windowpane, said receptacle gap including a gap base disposed between said first and second driver legs and above said connecting leg, said first driver leg being configured to mount and guide said driver on said guide rail and said second driver leg being elastically displaceable in relation to said first driver leg and has a latching element which protrudes into said receptacle gap, and when inserting the adjustable windowpane into said receptacle gap of said driver, said latching element engages in a pane-proximal latching opening of the adjustable windowpane;

said driver further having a resting contour on which said second driver leg is supported as a result of a tensile force acting on said latching element from the adjustable windowpane in a closing direction or by a closed position of the adjustable windowpane;

said driver having on said second driver leg a supporting contour that is spatially disposed downstream of said resting contour of said driver in a gap longitudinal direction in an insertion direction of the adjustable windowpane into said receptacle gap, between said gap base of said receptacle gap and said connecting leg;

said supporting contour on said second driver leg being integrally molded on said second driver leg so as to be movable in relation to said resting contour in the gap longitudinal direction; and said resting contour, in the gap longitudinal direction, is disposed downstream of said latching element.

2. The window lifter assembly according to claim 1, wherein said resting contour is disposed outside of said receptacle gap in a region between said gap base of said receptacle gap and said connecting leg.

3. The window lifter assembly according to claim 1, wherein a spacing between said supporting contour of said second driver leg and said resting contour of said driver decreases as a displacement of said latching element increases in the gap longitudinal direction toward a gap opening of said receptacle gap.

4. The window lifter assembly according to claim 1, wherein:

said supporting contour projects in a transverse direction in relation to the gap longitudinal direction of said receptacle gap; and/or said resting contour projects in the transverse direction in relation to the gap longitudinal direction of said receptacle gap.

5. The window lifter assembly according to claim 1, wherein, in a functional region that adjoins said gap base of said receptacle gap and which functional region contains said resting contour of said driver, said connecting leg between said two driver legs being configured as constricted in relation to at least said second driver leg.

6. The window lifter assembly according to claim 1, wherein:

said latching element has an introduction ramp which is inclined toward said gap base of said receptacle gap; and/or said latching element has a blocking edge which is inclination-free toward said gap base, said latching element, when connecting to the adjustable windowpane, penetrates the pane-proximal latching opening of the adjustable windowpane by way of said blocking edge.

7. The window lifter assembly according to claim 1, wherein said first driver leg has a rail wrap-around for said guide rail.

8. The window lifter assembly according to claim 1, wherein, in the gap longitudinal direction outside said receptacle gap, said resting contour is disposed in a region of said connecting leg in a connecting portion of said connecting leg, or said resting contour is integrally molded on said connecting leg.

9. A driver for a window lifter of a window lifter assembly, the driver comprising:

a first driver leg;

a second driver leg being elastically displaceable in relation to said first driver leg;

a receptacle gap defined between said first driver leg and said second driver leg for a windowpane having a latching opening formed therein;

a latching element, disposed on said second driver leg and protruding into said receptacle gap, for engaging in the latching opening of the windowpane;

a blocking function for blocking elongating and/or bending of said second driver leg containing said latching element beyond a permissible degree and/or after exceeding a specified or specifiable spacing between leg-proximal contours, said blocking function blocking elongating and/or bending as a result of a tensile force acting on the latching element by way of the windowpane in a closing direction or by a closed position of the windowpane;

said blocking function including:

a resting contour on which said second driver leg is supported as the result of the tensile force acting on said latching element from the windowpane in the closing direction or by the closed position of the windowpane;

a supporting contour on said second driver leg that is spatially disposed downstream of said resting contour of said driver in a gap longitudinal direction in an insertion direction of the windowpane into said receptacle gap; and said resting contour, in the gap longitudinal direction, being disposed downstream of said latching element.

* * * * *